US 6,532,896 B1

(12) United States Patent
Hurlbert (10) Patent No.: US 6,532,896 B1
(45) Date of Patent: Mar. 18, 2003

(54) BIRD FEEDER WITH RIGID TUBE AND FLEXIBLE BAG

(76) Inventor: Scott Hurlbert, N7811 Marsh La., Horicon, WI (US) 53032

( * ) Notice: Subject to any disclaimer, the term of this patent is extended or adjusted under 35 U.S.C. 154(b) by 0 days.

(21) Appl. No.: 10/060,672

(22) Filed: Feb. 1, 2002

(51) Int. Cl.[7] .............................................. A01K 39/01
(52) U.S. Cl. ..................................... 119/57.8; 119/52.2
(58) Field of Search .............................. 119/57.8, 52.2, 119/52.3, 57.9, 51.03, 469

(56) References Cited

U.S. PATENT DOCUMENTS

| | | | |
|---|---|---|---|
| 4,747,370 A | | 5/1988 | Olson |
| 4,996,947 A | | 3/1991 | Petrides |
| 5,642,689 A | * | 7/1997 | Harvey ...................... 119/57.8 |
| 5,740,758 A | * | 4/1998 | Damm ...................... 119/57.8 |
| 5,758,596 A | * | 6/1998 | Loiselle ..................... 119/52.2 |
| 6,047,661 A | * | 4/2000 | Lush ........................ 119/51.01 |
| 6,086,759 A | * | 7/2000 | Bisseker ..................... 210/169 |
| 6,390,021 B1 | * | 5/2002 | Krenzel ..................... 119/52.1 |
| 6,405,673 B1 | * | 6/2002 | Allender ..................... 119/469 |

* cited by examiner

Primary Examiner—Charles T. Jordan
Assistant Examiner—John W. Zerr
(74) Attorney, Agent, or Firm—Donald Cayen; Nicholas A. Brannen (57) ABSTRACT

A bird feeder comprises a generally rigid tube and a flexible bag. The tube has a bottom and a top and a wall therebetween. The bottom and top are open. A ledge is integrally connected to the outside surface of the wall close to or at its bottom. Feeding holes and perch holes are formed through the tube wall. A conventional wire hanger is used to hang the bird feeder. A cap removably slides onto the top of the tube to cover the tube. The bag has a mesh wall. The top of the bag is open and the bottom of the bag is closed. A band is located in the top of the bag. The bag is removably securable to the tube above the ledge on the outside surface of the wall. The band is tensioned to pull the bag tight around the outside surface of the tube.

20 Claims, 7 Drawing Sheets

BIRD FEEDER WITH RIGID TUBE AND FLEXIBLE BAG

FIELD OF INVENTION

This invention pertains to bird feeders, and more particularly to a bird feeder comprised of a rigid tube and a flexible mesh bag.

BACKGROUND OF THE INVENTION

Various types of apparatus have been developed for the feeding of birds and other wild animals. U.S. Pat. No. 5,829,382 to Garrison shows a bird feeder with a removable base U.S. Pat. No. 5,062,388 to Kilham shows a transparent cylindrical housing secured to a metallic ring, whereby birds feed through apertures formed in the ring. These bird feeders suffer from limited feeding areas. Hence, only a limited number of birds can feed simultaneously.

U.S. Pat. No. 5,479,881 to Lush shows a semi-rigid wild game feeder apparatus. This feeder also has a limited feeding area, and it is intended for use by other animals in addition to birds.

U.S. Pat. No. 4,996,947 to Petrides shows a feeder having a perch and holes below the perch. This feeder is intended for use only by goldfinches. Also, only a limited number of goldfinches can feed simultaneously.

U.S. Pat. No. 4,747,370 to Olson shows a bird feeder system with a bag and a downward telescoping section. Feed falls from the bag to a tray, and birds eat the feed from the tray.

It can be difficult, if not impossible, to disassemble many conventional bird feeders. This can make it difficult to clean the bird feeders. A dirty bird feeder detracts from the aesthetic quality of the natural surroundings, and it can spread avian diseases. Also, birds may choose not to feed from dirty feeders.

Conventional mesh bird feeders also suffer from disadvantages. Some mesh bird feeders cannot be refilled. Other conventional mesh feeders, while refillable, are hard to hold open when refilling. Further, conventional mesh feeders can hold only a limited amount of feed. Bird feeders comprised solely of mesh material provide no protection to the feed from the elements, thereby diminishing the quality of the feed.

Thus, a need exists for an improved bird feeder.

SUMMARY OF THE INVENTION

In accordance with the present invention, a bird feeder is provided that is easy to clean, that has a large feeding area and a large feed storage capacity, and that enables multiple birds to simultaneously feed. This is accomplished by apparatus that includes a generally rigid tube and a flexible bag that is removably secured to the tube.

The tube is made from a transparent material, such as plastic. The tube is vertically oriented and has an open bottom and top, and a wall there between. A ledge is integrally connected to the outside surface of the tube wall close to or at its bottom. Feeding holes are formed through the wall. Perch holes are also formed through the wall near the feeding holes. A perch is inserted through the perch holes to enable a bird to rest on the perch while feeding. A conventional wire hanger is used to hang the bird feeder. The hanger attaches to a hanger bar that extends through the tube. A cap removably slides onto the top of the tube to cover the tube.

The bag is made from a flexible material, such as mesh. The mesh bag has numerous holes formed therein. The bag has an open top and a closed bottom. A band is connected to the top of the bag. The band can be tensioned to removably secure the bag to the tube.

It is apparent to those skilled in the art that a bird feeder is provided that is closed to the outside except for the intended feeding holes the tube and the holes in the mesh bag. Thus, birds can choose to feed from the tube or the bag.

Another advantage of the present bird feeder is that it is easy to clean. The cap can be removed from the top of the tube and the hanger bar and perch can be removed from the tube. The bag can be easily removed from the bottom of the tube by relieving the tension from the band. Being free of any obstructions, a brush can easily clean the inside of the tube. The removed bag can be washed, rinsed, or otherwise cleaned in any suitable manner.

Other advantages, benefits, and features of the invention will become apparent to those the skilled in the art upon reading the detailed description of the invention and studying the drawings.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

The bird feeder 1 of the present invention is comprised of a tube 5 and a bag 61 and is shown in FIGS. 1–8. The tube 5 is preferably made of transparent and rigid plastic. Other suitable materials such as glass could be used without departing from the broad aspects of the invention.

Figure 2:
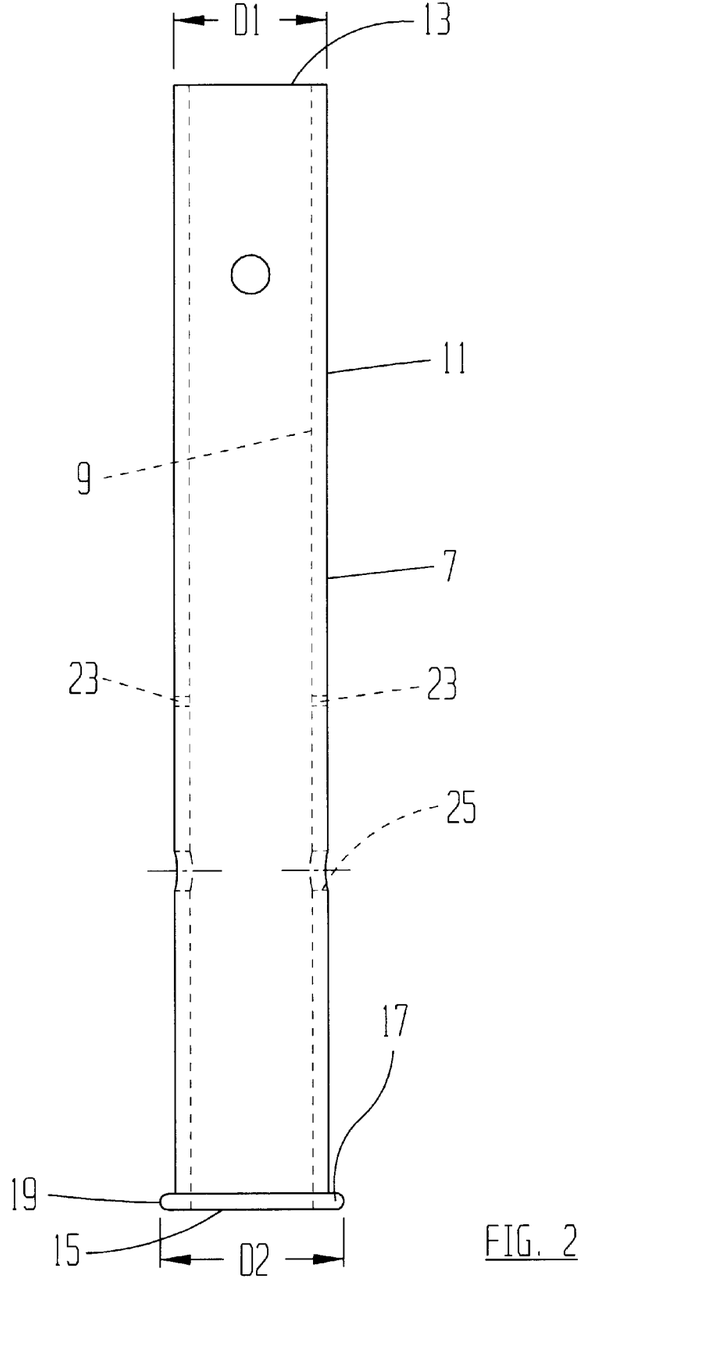
FIG. 2 is a front view of the tube shown in FIG. 1.
Figure 3:
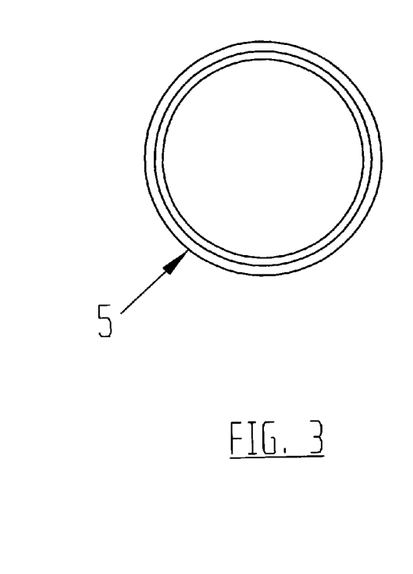
FIG. 3 is a top view of the bird feeder.

In the illustrated construction, the tube 5 has a wall 7 with a circular cross-section with an inside surface 9 and an outside surface 11, as shown in FIGS. 2 and 3. The outside surface 11 has an outside diameter D1. The tube 5 has a top 13 and an opposed bottom 15. A ledge 17 is integrally connected to the outside surface 11 of the wall 7. In one embodiment, the ledge 17 is located a short distance from the bottom 15 of the tube 5. In another embodiment, the ledge 17 is integrally connected to the bottom 15 of the tube 5. The ledge 17 extends out a predetermined distance beyond the outer surface 11 of the tube 5. The outer surface 19 of the ledge has an outside diameter D2.

Opposed feeding holes 23 are formed through the wall 7 of the tube 5. Opposed perch holes 25 are also formed through the wall 7 of the tube 5. The perch holes 25 are located near the feeding holes 23, and can be oriented through the wall 7 similar to the feeding holes 23. In one embodiment, the perch holes 25 are located a predetermined distance below their corresponding feeding holes 23. A perch bar 27 extends through the wall 7 and extends out from the perch holes 25. More than one pair of feeding holes 23 and corresponding perch holes 25 can be formed through the tube wall 7.

Figure 1:
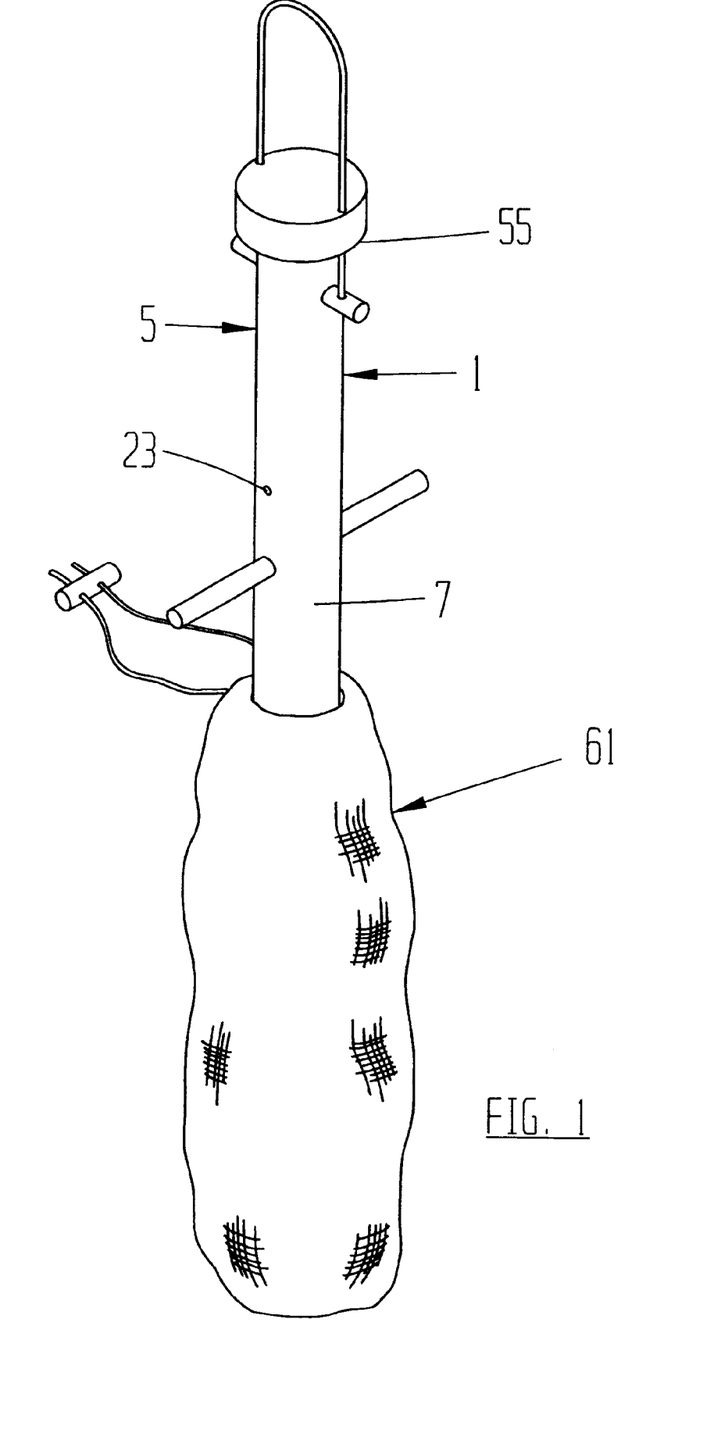
FIG. 1 is a perspective view of the bird feeder of the present invention.

In the particular construction illustrated, opposed hanger holes 31 are formed through the wall 7 near the top 13 of the tube 5. A hanger bar 33 extends through the wall 7 and out through the hanger holes 31. The hanger bar 33 has opposed ends 35. Holes 37 are formed through the bar 33 proximal its ends 35. The distance between the holes 37 is greater than the outside diameter D1 of the tube 5. Holes 37 are located outside of the tube 5 when the bar 33 is placed through the tube. A wire hanger 39 is generally shaped like an inverted U, having a bight 40 and opposed ends 41. The bight 40 of the hanger 39 is above the holes 37, and the ends 41 are bent after they are extended through the holes 37. The hanger 39 is thus prevented from being inadvertently removed from the hanger bar 33.

A cap 45 covers the top 13 of the tube 5. The cap 45 has a generally flat top surface 47. The top surface 47 is circular in shape and has an outer edge 49. Opposed holes 51 are formed through the top surface 47 near the outer edge 49. A rim 53 extends down from the outer edge 49 of the top surface 47 to a rim bottom 55. The rim 53 has a circular inside diameter. The rim inside diameter is greater than the outside diameter D1 of the tube 5. The cap is removably slid onto the tube 5, such that the inside surface of the cap rim slides over the outside surface 11 of the tube. Gravity and friction between the cap and tube surfaces assure that the cap remains in place until intentionally removed.

Figure 4:
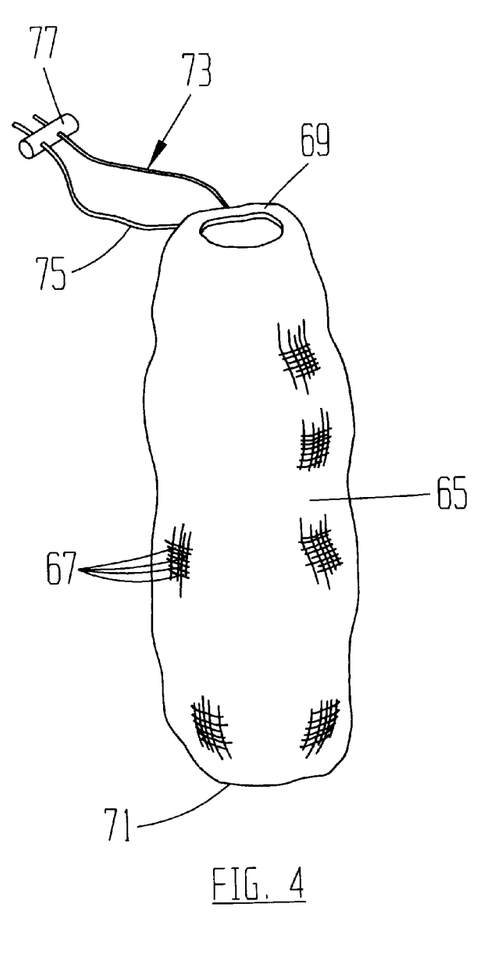
FIG. 4 is a perspective view of the bag shown in FIG. 1.

The bag 61 preferably has a flexible mesh wall 65. The mesh wall 65 may be comprised of coarse cloth, interwoven string, or plastic. Other suitable material may be used without departing from the broad aspects of the invention. The mesh wall 65 has numerous holes 67 formed therethrough. The bag 61 has a top 69 and an opposed bottom 71. The holes 67 can be oriented in a plane parallel with the top and bottom 69 and 71, respectively, of the bag 61. The holes 67 alternatively can be randomly oriented. The top 69 is open and has a nominal diameter. The bottom 71 is permanently closed. The bottom may be sewn closed. However, other suitable methods of permanently closing the bottom 71 may be used without departing from the broad aspects of the invention.

Figure 7:
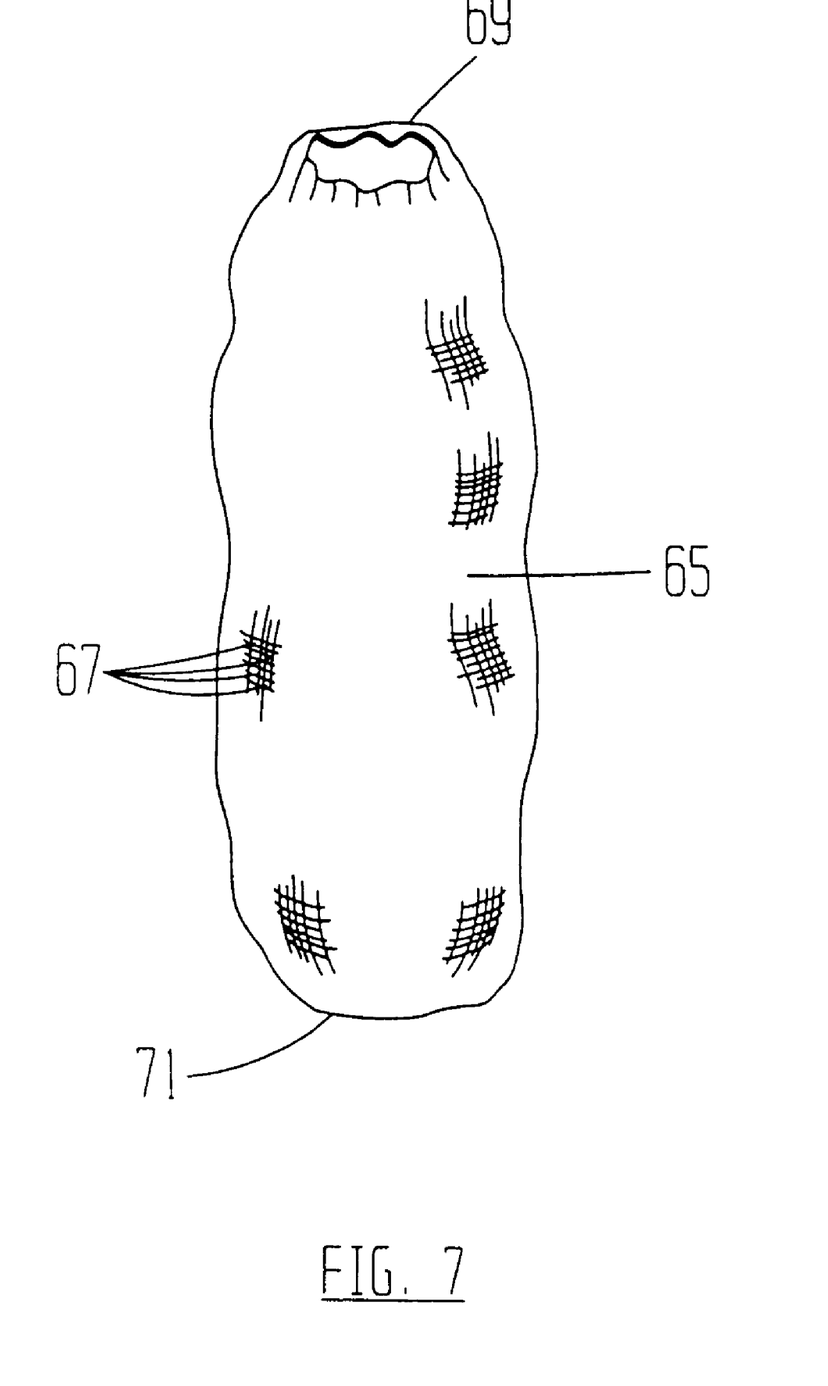
FIG. 7 is similar to FIG. 4, but shows the band comprised of an elastic material.
Figure 8:
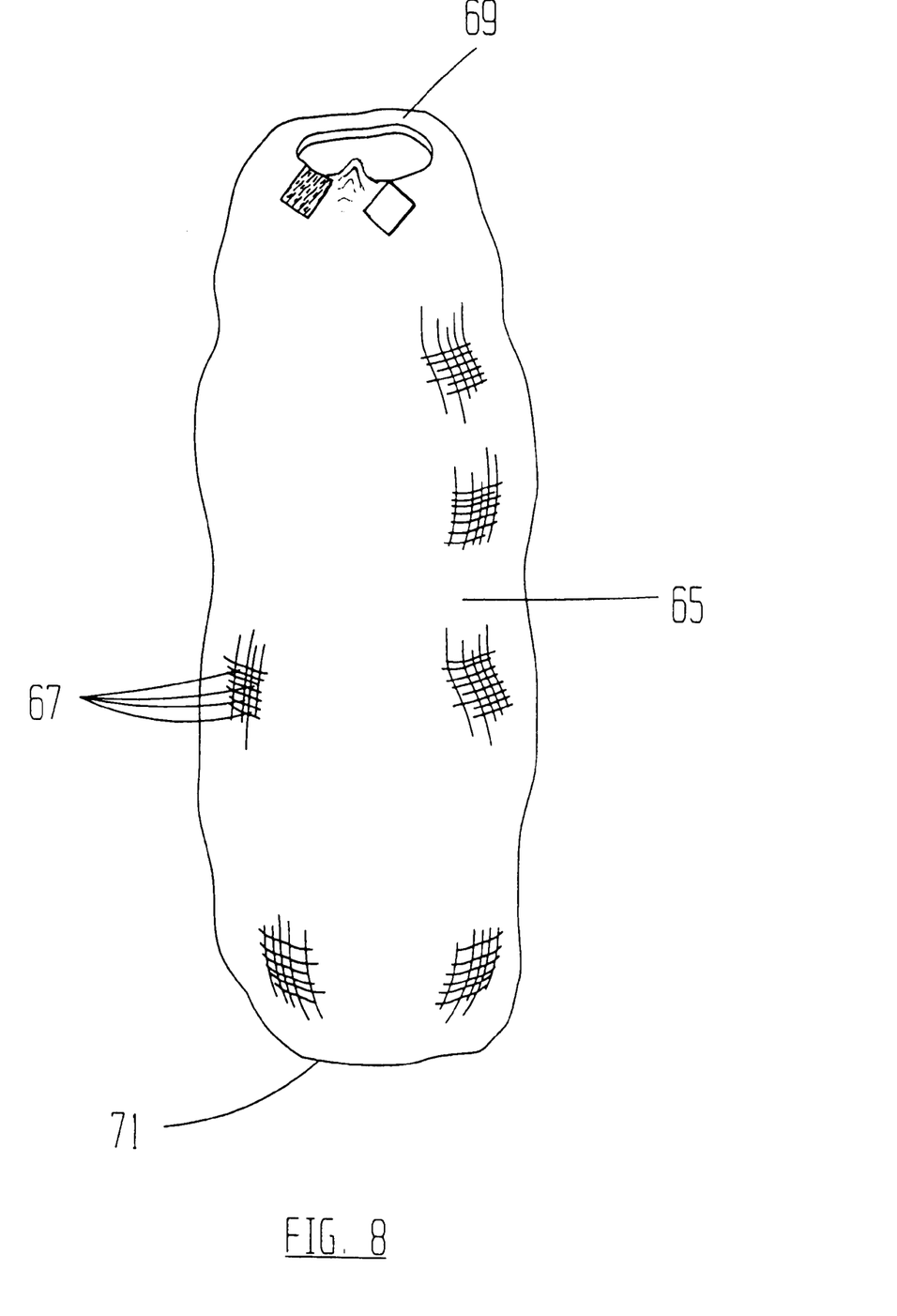
FIG. 8 is similar to FIG. 4, but shows the band comprised of a hook and eye fastener.

A band 73 is used to selectively reduce the nominal diameter of the top of the bag 61. One embodiment of the band 73 comprises a drawstring 75. Any one of many clip mechanisms 77 generally known in the art can be used in conjunction with the drawstring 75 to reduce the nominal diameter at the top 69 of the bag 61. Alternatively, the band 73 may be comprised of a piece of elastic material. The elastic material biases the top 69 of the bag such that its nominal diameter is normally less than the diameter D2 of the ledge 17 of the tube 5. Another embodiment of the band 73 comprises commonly available hook and eye material.

Figure 5:
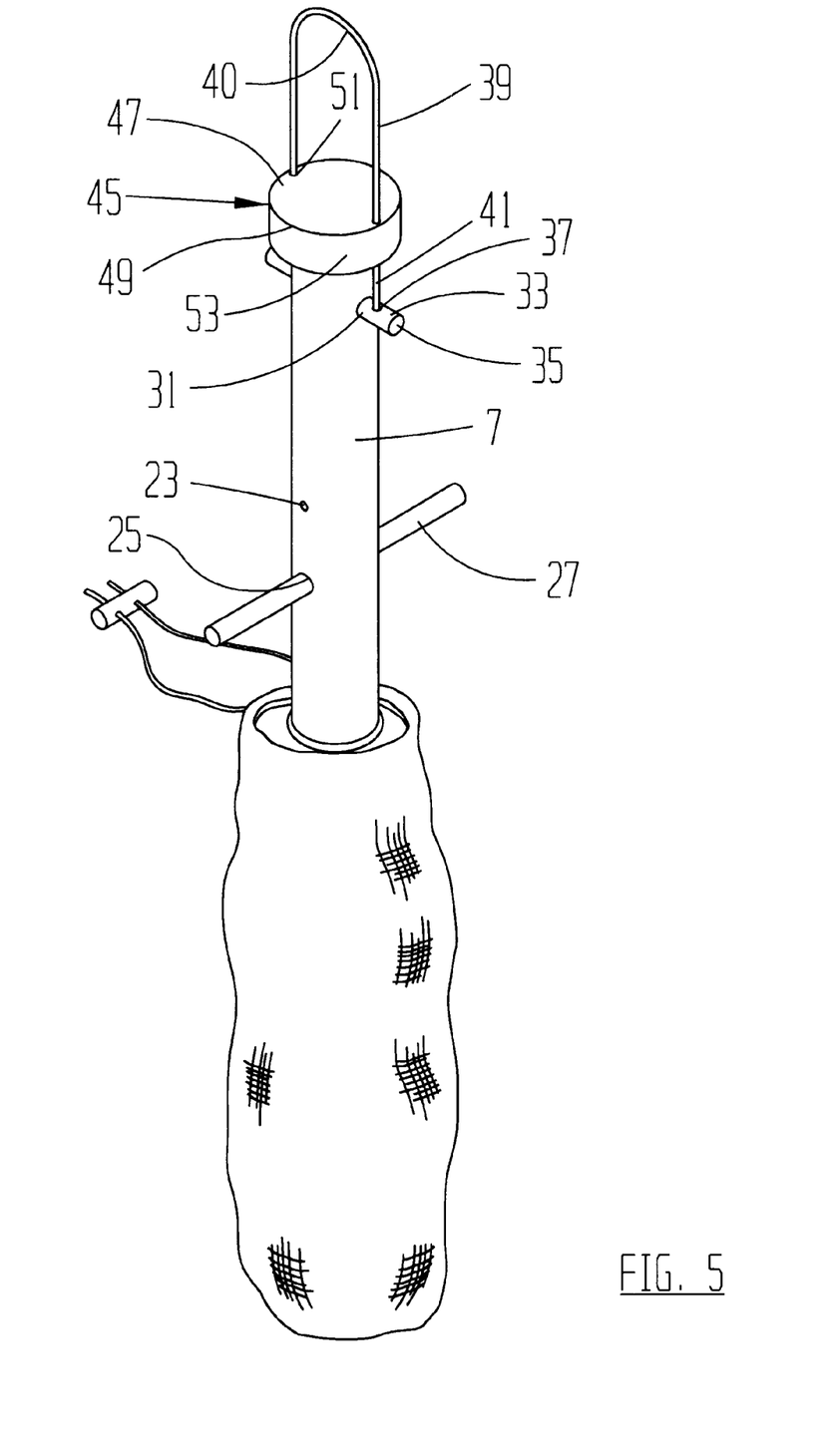
FIG. 5 is a perspective view of the bird feeder shown in FIG. 1, showing placement of the bag around the outside surface of the tube without any tension present on the band.
Figure 6:
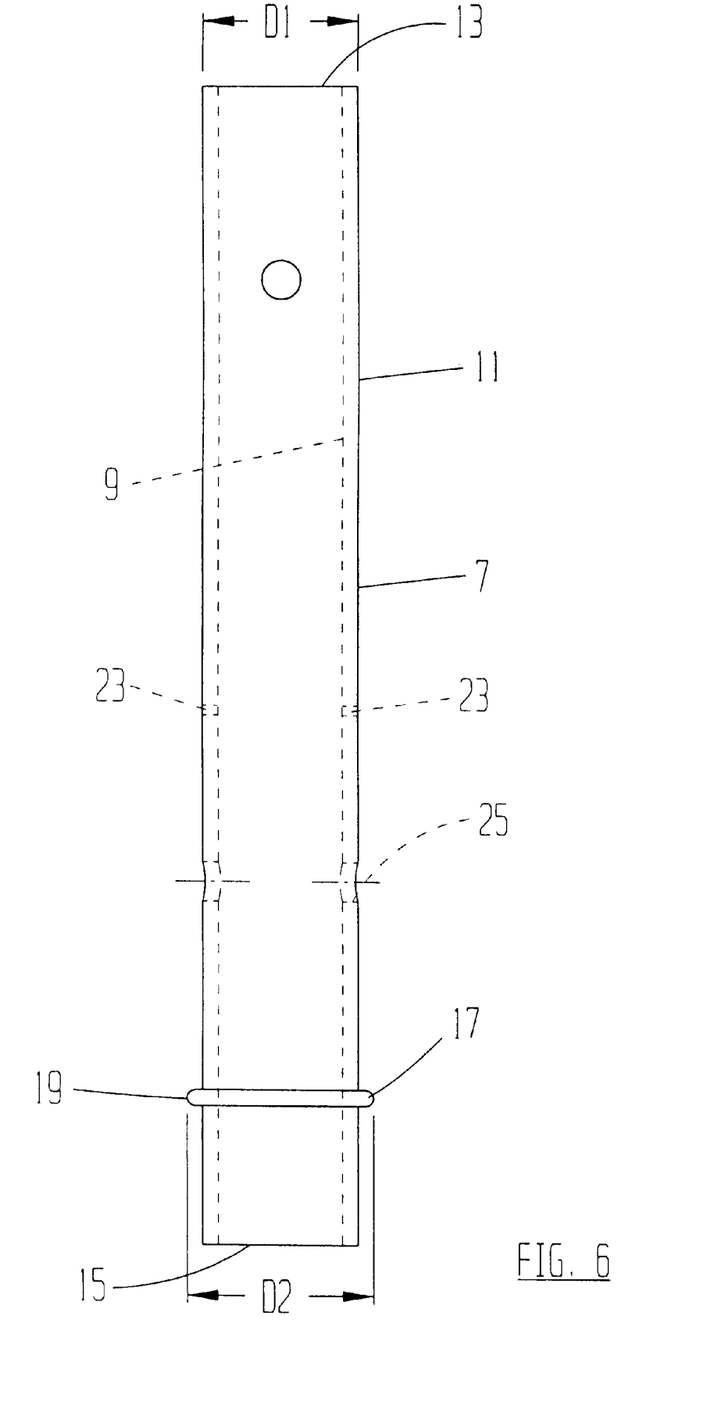
FIG. 6 is similar to FIG. 2, but shows the ledge connected to the outside surface of the wall of the tube a short distance from the bottom of the tube.

The bag 61 is removably secured to the tube 5. The open top 69 of the bag is slid over the ledge 17 adjacent the bottom 15 of the tube 5. The band is tensioned such that the top 69 of the bag tightly engages the outside surface 11 of the tube 5 above the ledge 17. The nominal diameter of the top of the bag 61 is reduced to a length substantially equal to the diameter D1 of the outside surface 11 of the tube 5 and less than the diameter D2 of the ledge 17. The bag 61 is then unable to slide over the ledge 17 and thus remains secured to the tube 5 until a person releases the tension from the band 73.

In use, the feeder 1 is assembled by inserting the hanger bar 33 through the hanger holes 31. Ends 41 of the hanger wire 39 are inserted through the holes 51 on the top surface 47 of the cap 45 and through the holes 37 of the hanger bar 33. The ends 41 are then bent to prevent removal of the hanger wire 39 from the hanger bar 35. The perch bar 27 is then inserted through the perch holes 25. The bag 61 is placed around the outside surface 11 of the tube 5 and above the ledge 17. The band 73 is then tensioned to prevent the bag 61 from being removed from the tube 5.

Disassembly of the bird feeder 1 occurs in the opposite manner. Once disassembled, the tube 5 may be cleaned using one of many brushes commonly available. The mesh bag 61 can also be cleaned. The bag 61 can be rinsed or washed using water. Soap may optionally be used. Turning the bag inside out intermittently between washings can extend time period between washings.

Pouring feed through the open top 13 of the tube 5 fills the entire feeder 1. Feed falls through the tube 5 and into the bag 61 without having to remove the bag 61 from the tube 5. The bird feed in the bag 61 normally does not fall through the holes 67. The bird feeder 1 of the present invention has a larger feed capacity than that of conventional feeders, because both the tube 5 and the bag 61 can be filled. The feed in the tube 5 is protected from the elements. The bird feeder 1 of the present invention has a larger feeding area than conventional feeders, because birds can access the feed through both the tube holes 23 and the bag holes 67.

Birds choosing to feed through the tube's feeding holes 23 can rest on the perch bar 27. Birds choosing to feed through the bag holes 67 can rest directly on the bag 61. In this regard, some birds may prefer one way to access the feed over the other way. The bird feeder 1 of the present invention accommodates both preferences.

Thus it is apparent that there has been provided, in accordance with the invention, a bird feeder that fully satisfies the aims and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim:

1. A bird feeder comprising:
    a. a tube having a top and a bottom, a wall therebetween, and a ledge, said top of said tube being open and removably covered with a cap imperforate with respect to said top of said tube, said bottom of said tube being substantially open, said wall having an outside surface, and said ledge being integrally connected to said outside surface of said wall; and
    b. a flexible bag having a top, a bottom, and a mesh wall therebetween, said top of said bag being open and having a band attached thereto, said bottom of said bag being closed,
        wherein said top of said bag is removably securable by the band to said tube between said ledge and the tube top.

2. The bird feeder of claim 1 wherein said ledge is integrally connected to said outside surface of said wall a short distance from said bottom of said tube.

3. The bird feeder of claim 1 wherein said ledge is integrally connected to said outside surface of said wall at said bottom of said tube.

4. The bird feeder of claim 1 wherein said band is comprised of a drawstring.

5. The bird feeder of claim 1 wherein said band is comprised of an elastic material.

6. The bird feeder of claim 1 wherein said band is comprised of hook and eye fabric.

7. The bird feeder of claim 1 wherein said wall of said tube has perch holes and feeding holes formed therethrough, and wherein said perch holes are located near said feeding holes.

8. The bird feeder of claim 7 wherein said perch holes are located below said feeding holes.

9. A method of using a bird feeder comprising the steps of:
   a. providing a tube having a wall with an outside surface of a first diameter and perch and feeding holes through the wall, an open top, an open bottom, and a ledge having a second diameter greater than the first diameter proximate the tube bottom;
   b. inserting a perch bar into the tube perch holes;
   c. providing a flexible bag with multiple feeding holes, an open top having a nominal third diameter greater than the second diameter, a closed bottom, and a band around the bag top;
   d. placing the bag top and band around the outside surface of the tube between the ledge and the tube top;
   e. applying tension to the band such that the nominal third diameter of the bag top becomes substantially equal to the first diameter;
   f. filling the tube and the bag with feed by pouring the feed through the open top of the tube; and
   g. covering the top of the tube.

10. The method of claim 9 further comprising the further step of refilling the bag by uncovering the tube open top and pouring bird feed into the open top of the tube.

11. The method of claim 9 comprising the further step of disassembling the feeder by:
   a. removing the tension of the band;
   b. removing the bag from the tube;
   c. removing the perch bar; and
   d. uncovering the top of the tube.

12. A bird feeder comprising:
   a. a tube having a top and a bottom, a wall therebetween that defines a plurality of feeding holes, and a ledge, said top of said tube being open and removably covered with a cap, said bottom of said tube being substantially open, said wall having an outside surface, and said ledge being integrally connected to said outside surface of said wall; and
   b. a flexible bag having a top, a bottom, and a mesh wall therebetween, said top of said bag being open and having a band attached thereto, said bottom of said bag being closed,
   wherein said top of said bag is removably securable by said band to said tube between said ledge and said tube top, and
   wherein said bird feeder is substantially fillable with bird seed.

13. The bird feeder of claim 12 wherein said ledge is integrally connected to said outside surface of said wall a short distance from said bottom of said tube.

14. The bird feeder of claim 12 wherein said ledge is integrally connected to said outside surface of said wall at said bottom of said tube.

15. The bird feeder of claim 12 wherein said band is comprised of a drawstring.

16. The bird feeder of claim 12 wherein said band is comprised of an elastic material.

17. The bird feeder of claim 12 wherein said band is comprised of hook and eye fabric.

18. The bird feeder of claim 12 wherein:
   a. said wall defines at least two feeding holes; and
   b. said wall of said tube defines at least two perch holes located near said at least two feeding holes for receiving a perch.

19. The bird feeder of claim 18 wherein said at least two perch holes are located below said at least two feeding holes.

20. The bird feeder of claim 12 wherein said cap is imperforate with respect to said top of said tube.

* * * * *